US012701576B2

(12) United States Patent
Wang et al.

(10) Patent No.: US 12,701,576 B2
(45) Date of Patent: Aug. 4, 2026

(54) BASE STATION-AIDED USER EQUIPMENT (UE) ANTENNA SELECTION

(71) Applicant: QUALCOMM Incorporated, San Diego, CA (US)

(72) Inventors: Runxin Wang, San Diego, CA (US); Yu Zhang, San Diego, CA (US); Muhammad Sayed Khairy Abdelghaffar, San Jose, CA (US); Jing Jiang, San Diego, CA (US)

(73) Assignee: QUALCOM Incorporated, San Diego, CA (US)

( * ) Notice: Subject to any disclaimer, the term of this patent is extended or adjusted under 35 U.S.C. 154(b) by 276 days.

(21) Appl. No.: 18/568,631

(22) PCT Filed: Aug. 21, 2021

(86) PCT No.: PCT/CN2021/113925

§ 371 (c)(1),
(2) Date: Dec. 8, 2023

(87) PCT Pub. No.: WO2023/023877

PCT Pub. Date: Feb. 3, 2023

(65) Prior Publication Data

US 2025/0324423 A1     Oct. 16, 2025

(51) Int. Cl.
*H04W 72/21* (2023.01)
*H04L 5/00* (2006.01)
*H04W 72/23* (2023.01)

(52) U.S. Cl.
CPC ........... *H04W 72/21* (2023.01); *H04L 5/0048* (2013.01); *H04W 72/23* (2023.01)

(58) Field of Classification Search
CPC ...... H04W 72/21; H04W 72/23; H04L 5/0048
(Continued)

(56) References Cited

U.S. PATENT DOCUMENTS 10,674,351 B2 * 6/2020 Sundararajan ....... H04B 7/0691
10,819,407 B2 * 10/2020 Park ..................... H04L 5/0094
(Continued)

FOREIGN PATENT DOCUMENTS

CA       3223207 A1 * 1/2023 .......... H04B 7/0634
CN   108631999 A   10/2018
(Continued)

OTHER PUBLICATIONS

International Search Report and Written Opinion—PCT/CN2021/113925—ISA/EPO—May 23, 2022.
(Continued)

*Primary Examiner* — Anthony Mejia
(74) *Attorney, Agent, or Firm* — QUALCOMM Incorporated

(57) ABSTRACT

This disclosure provides systems, methods, and devices for wireless communication that support mechanisms for base station-assisted UE antenna port selection. A user equipment (UE) transmits, to a base station, a sounding reference signal (SRS) switching capability report (e.g., a xTyR report) indicating to the base station a number of receive antenna ports configured for the UE. (e.g., capability to transmit on x antenna ports and reception over a total of y antenna ports). The UE transmits an SRS to the base station sounding the y antenna ports. The base station selects and indicates y' antenna ports out of the y antenna ports for the UE to receive a subsequent downlink data transmission based on a channel estimation based on the SRS transmission, or based on channel state feedback (CSF). In aspects, the UE provides a recommendation of y', and the base station may determine y' based on the UE's recommendation.

27 Claims, 7 Drawing Sheets

*300*

(58) Field of Classification Search
USPC ........................................................ 370/329
See application file for complete search history.

(56) References Cited

U.S. PATENT DOCUMENTS

| | | | | |
|---|---|---|---|---|
| 12,261,667 B2* | 3/2025 | Cheng | ................. | H04L 25/0228 |
| 2013/0301454 A1* | 11/2013 | Seol | ..................... | H04B 7/0456 |
| | | | | 370/252 |
| 2018/0227094 A1* | 8/2018 | Liu | ........................ | H04L 5/0025 |
| 2020/0322933 A1* | 10/2020 | Zhang | ................. | H04B 7/0639 |
| 2021/0112498 A1* | 4/2021 | Duan | ................... | H04B 7/0817 |
| 2022/0209839 A1* | 6/2022 | Cheng | ................... | H04L 5/0057 |
| 2023/0224134 A1* | 7/2023 | Li | ......................... | H04L 5/0048 |
| | | | | 370/329 |
| 2023/0283335 A1* | 9/2023 | Levitsky | ................ | H04B 7/061 |
| | | | | 370/252 |
| 2023/0361840 A1* | 11/2023 | Santhappan | ......... | H04B 17/345 |
| 2024/0147288 A1* | 5/2024 | Huang | .................... | H04B 17/24 |
| 2024/0155393 A1* | 5/2024 | Han | ...................... | H04W 24/10 |
| 2024/0259066 A1* | 8/2024 | Li | ......................... | H04B 7/0456 |
| 2025/0274893 A1* | 8/2025 | Yao | ....................... | H04W 24/08 |
| 2025/0344221 A1* | 11/2025 | Matsumura | ....... | H04W 72/1268 |

FOREIGN PATENT DOCUMENTS

| | | | | | |
|---|---|---|---|---|---|
| EP | 4027568 | A1 | * | 7/2022 | ........... H04L 5/0048 |
| EP | 3370348 | B1 | * | 10/2024 | ........... H04B 7/0478 |
| WO | WO-2018232125 | | | 12/2018 | |

OTHER PUBLICATIONS

Lenovo., et al., "Enhancements on SRS", 3GPP TSG RAN WG1#104bis-e, R1-2102842, e-Meeting, Apr. 12-20, 2021, Apr. 20, 2021 (Apr. 20, 2021), pp. 1-13, the whole document.

* cited by examiner

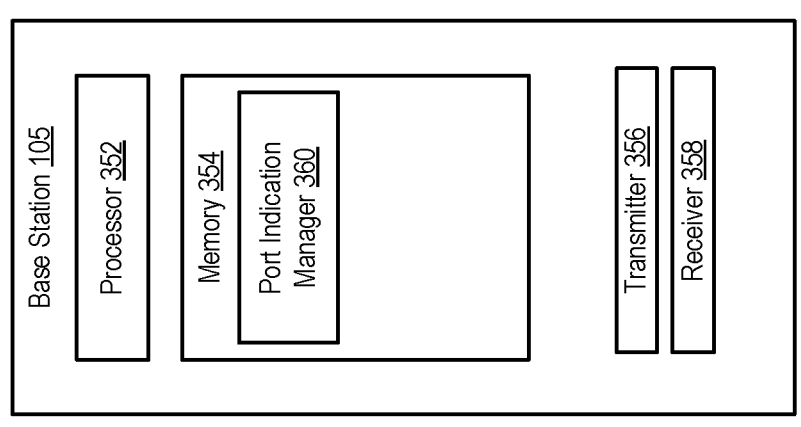
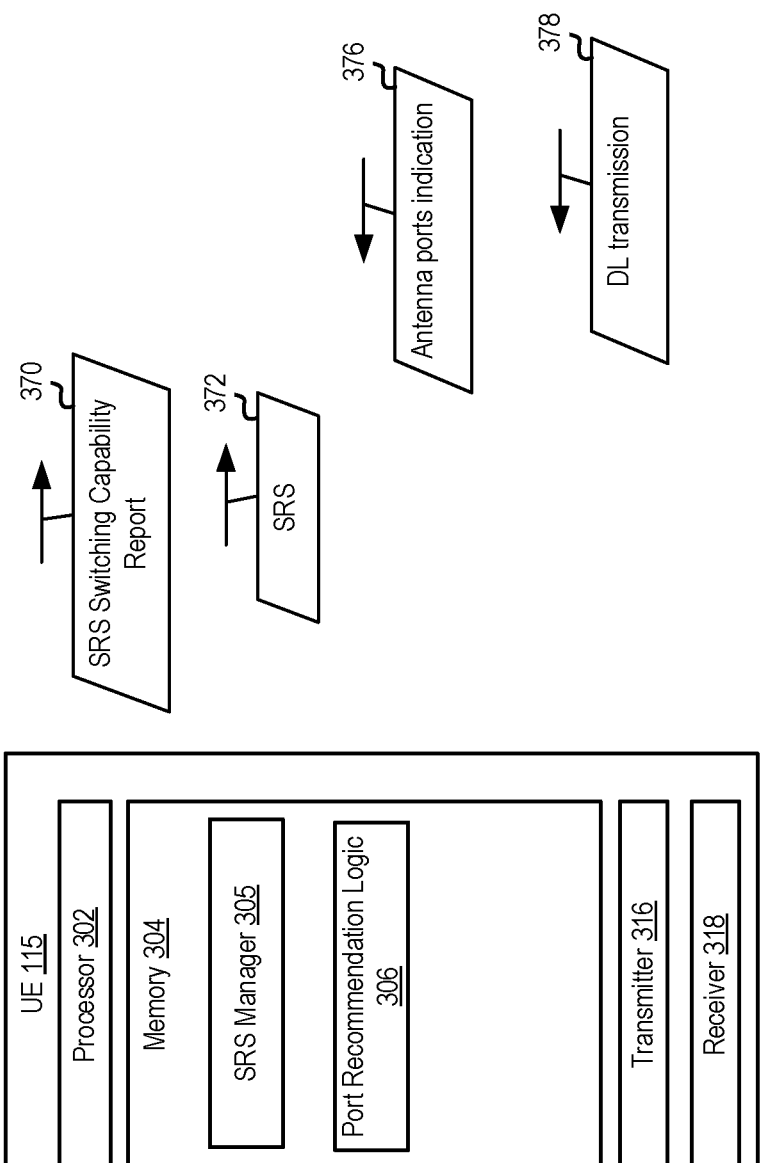
*FIG. 3*

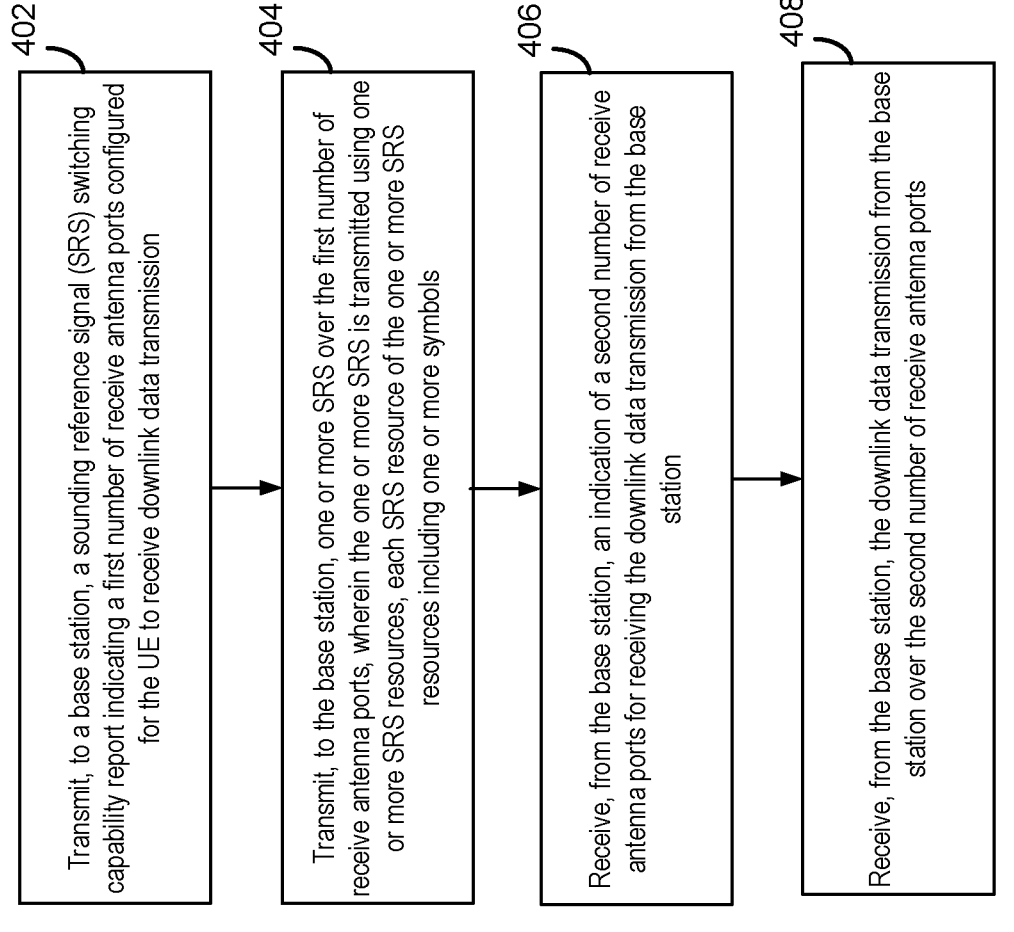

402

Transmit, to a base station, a sounding reference signal (SRS) switching capability report indicating a first number of receive antenna ports configured for the UE to receive downlink data transmission

404

Transmit, to the base station, one or more SRS over the first number of receive antenna ports, wherein the one or more SRS is transmitted using one or more SRS resources, each SRS resource of the one or more SRS resources including one or more symbols

406

Receive, from the base station, an indication of a second number of receive antenna ports for receiving the downlink data transmission from the base station

408

Receive, from the base station, the downlink data transmission from the base station over the second number of receive antenna ports

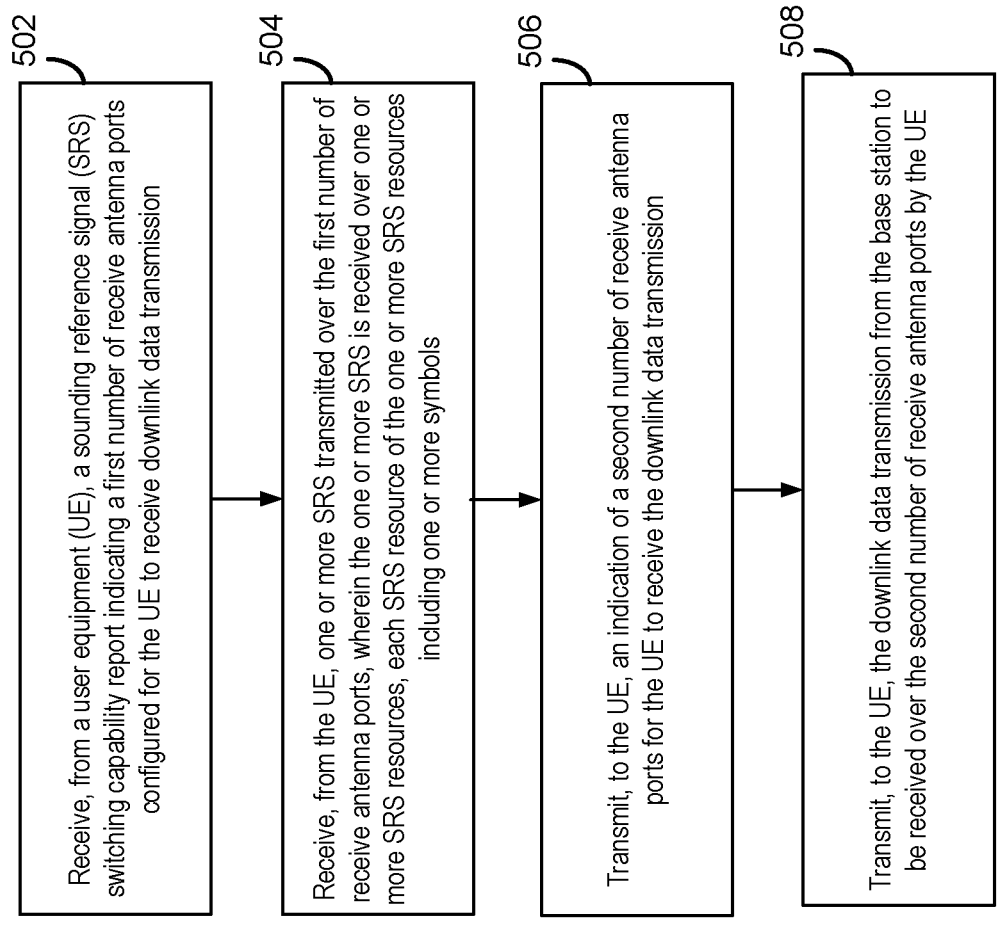

502

Receive, from a user equipment (UE), a sounding reference signal (SRS) switching capability report indicating a first number of receive antenna ports configured for the UE to receive downlink data transmission

504

Receive, from the UE, one or more SRS transmitted over the first number of receive antenna ports, wherein the one or more SRS is received over one or more SRS resources, each SRS resource of the one or more SRS resources including one or more symbols

506

Transmit, to the UE, an indication of a second number of receive antenna ports for the UE to receive the downlink data transmission

508

Transmit, to the UE, the downlink data transmission from the base station to be received over the second number of receive antenna ports by the UE

BASE STATION-AIDED USER EQUIPMENT (UE) ANTENNA SELECTION

CROSS-REFERENCE TO RELATED APPLICATIONS

This Patent Application is a 371 National Stage of PCT Application No. PCT/CN2021/113925, filed on Aug. 21, 2021, entitled "BASE-STATION-AIDED USER EQUIPMENT (UE) ANTENNA SELECTION," and assigned to the assignee hereof. The disclosure of the prior Application is considered part of and is incorporated by reference into this Patent Application.

TECHNICAL FIELD

Aspects of the present disclosure relate generally to wireless communication systems, and more particularly, to base station-assisted user equipment (UE) antenna port selection.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes transmitting, to a base station, a sounding reference signal (SRS) switching capability report indicating a first number of receive antenna ports configured for the UE to receive downlink data transmission, and transmitting, to the base station, one or more SRS over the first number of receive antenna ports. In aspects, the one or more SRS is transmitted using one or more SRS resources, and each SRS resource of the one or more SRS resources includes one or more symbols. The method also includes receiving, from the base station, an indication of a second number of receive antenna ports for receiving the downlink data transmission from the base station, and receiving, from the base station, the downlink data transmission from the base station over the second number of receive antenna ports.

In an additional aspect of the disclosure, a method of wireless communication performed by a base station includes receiving, from a UE, an SRS switching capability report indicating a first number of receive antenna ports configured for the UE to receive downlink data transmission, and receiving, from the UE, one or more SRS transmitted over the first number of receive antenna ports. In aspects, the one or more SRS is received over one or more SRS resources, and each SRS resource of the one or more SRS resources includes one or more symbols. The method also includes transmitting, to the UE, an indication of a second number of receive antenna ports for the UE to receive the downlink data transmission, and transmitting, to the UE, the downlink data transmission from the base station to be received over the second number of receive antenna ports by the UE.

In an additional aspect of the disclosure, a UE includes at least one processor and a memory coupled to the at least one processor. The at least one processor stores processor-readable code that, when executed by the at least one processor, is configured to perform operations including transmitting, to a base station, an SRS switching capability report indicating a first number of receive antenna ports configured for the UE to receive downlink data transmission, and transmitting, to the base station, one or more SRS over the first number of receive antenna ports. In aspects, the one or more SRS is transmitted using one or more SRS resources, and each SRS resource of the one or more SRS resources includes one or more symbols. The operations also include receiving, from the base station, an indication of a second number of receive antenna ports for receiving the downlink data transmission from the base station, and receiving, from the base station, the downlink data transmission from the base station over the second number of receive antenna ports.

In an additional aspect of the disclosure, a base station includes at least one processor and a memory coupled to the at least one processor. The at least one processor stores processor-readable code that, when executed by the at least one processor, is configured to perform operations including receiving, from a UE, an SRS switching capability report indicating a first number of receive antenna ports configured for the UE to receive downlink data transmission, and receiving, from the UE, one or more SRS transmitted over the first number of receive antenna ports. In aspects, the one or more SRS is received over one or more SRS resources, and each SRS resource of the one or more SRS resources includes one or more symbols. The operations also include transmitting, to the UE, an indication of a second number of receive antenna ports for the UE to receive the downlink data transmission, and transmitting, to the UE, the downlink data transmission from the base station to be received over the second number of receive antenna ports by the UE.

In an additional aspect of the disclosure, a non-transitory computer-readable medium stores instructions that, when executed by a processor, cause the processor to perform operations. The operations include transmitting, from a UE to a base station, an SRS switching capability report indicating a first number of receive antenna ports configured for the UE to receive downlink data transmission, and transmitting, to the base station, one or more SRS over the first number of receive antenna ports. In aspects, the one or more SRS is transmitted using one or more SRS resources, and each SRS resource of the one or more SRS resources includes one or more symbols. The operations also include receiving, from the base station, an indication of a second number of receive antenna ports for receiving the downlink data transmission from the base station, and receiving, from the base station, the downlink data transmission from the base station over the second number of receive antenna ports.

In an additional aspect of the disclosure, a non-transitory computer-readable medium stores instructions that, when executed by a processor, cause the processor to perform operations. The operations include receiving, by a base station from a UE, an SRS switching capability report indicating a first number of receive antenna ports configured for the UE to receive downlink data transmission, and receiving, from the UE, one or more SRS transmitted over the first number of receive antenna ports. In aspects, the one or more SRS is received over one or more SRS resources, and each SRS resource of the one or more SRS resources includes one or more symbols. The operations also include transmitting, to the UE, an indication of a second number of receive antenna ports for the UE to receive the downlink data transmission, and transmitting, to the UE, the downlink data transmission from the base station to be received over the second number of receive antenna ports by the UE.

In an additional aspect of the disclosure, an apparatus includes means for transmitting, from a UE to a base station, an SRS switching capability report indicating a first number of receive antenna ports configured for the UE to receive downlink data transmission, and means for transmitting, to the base station, one or more SRS over the first number of receive antenna ports. In aspects, the one or more SRS is transmitted using one or more SRS resources, and each SRS resource of the one or more SRS resources includes one or more symbols. The apparatus also includes means for receiving, from the base station, an indication of a second number of receive antenna ports for receiving the downlink data transmission from the base station, and means for receiving, from the base station, the downlink data transmission from the base station over the second number of receive antenna ports.

In an additional aspect of the disclosure, an apparatus includes means for receiving, by a base station from a UE, an SRS switching capability report indicating a first number of receive antenna ports configured for the UE to receive downlink data transmission, and means for receiving, from the UE, one or more SRS transmitted over the first number of receive antenna ports. In aspects, the one or more SRS is received over one or more SRS resources, and each SRS resource of the one or more SRS resources includes one or more symbols. The apparatus also includes means for transmitting, to the UE, an indication of a second number of receive antenna ports for the UE to receive the downlink data transmission, and means for transmitting, to the UE, the downlink data transmission from the base station to be received over the second number of receive antenna ports by the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports mechanisms for base station-assisted UE antenna port selection according to one or more aspects.

FIG. 4 is a flow diagram illustrating an example process that supports mechanisms for base station-assisted UE antenna port selection according to one or more aspects.

FIG. 5 is a flow diagram illustrating an example process that supports mechanisms for base station-assisted UE antenna port selection according to one or more aspects.

Like reference numbers and designations in the various drawings indicate like elements.

DETAILED DESCRIPTION

Figure 1:
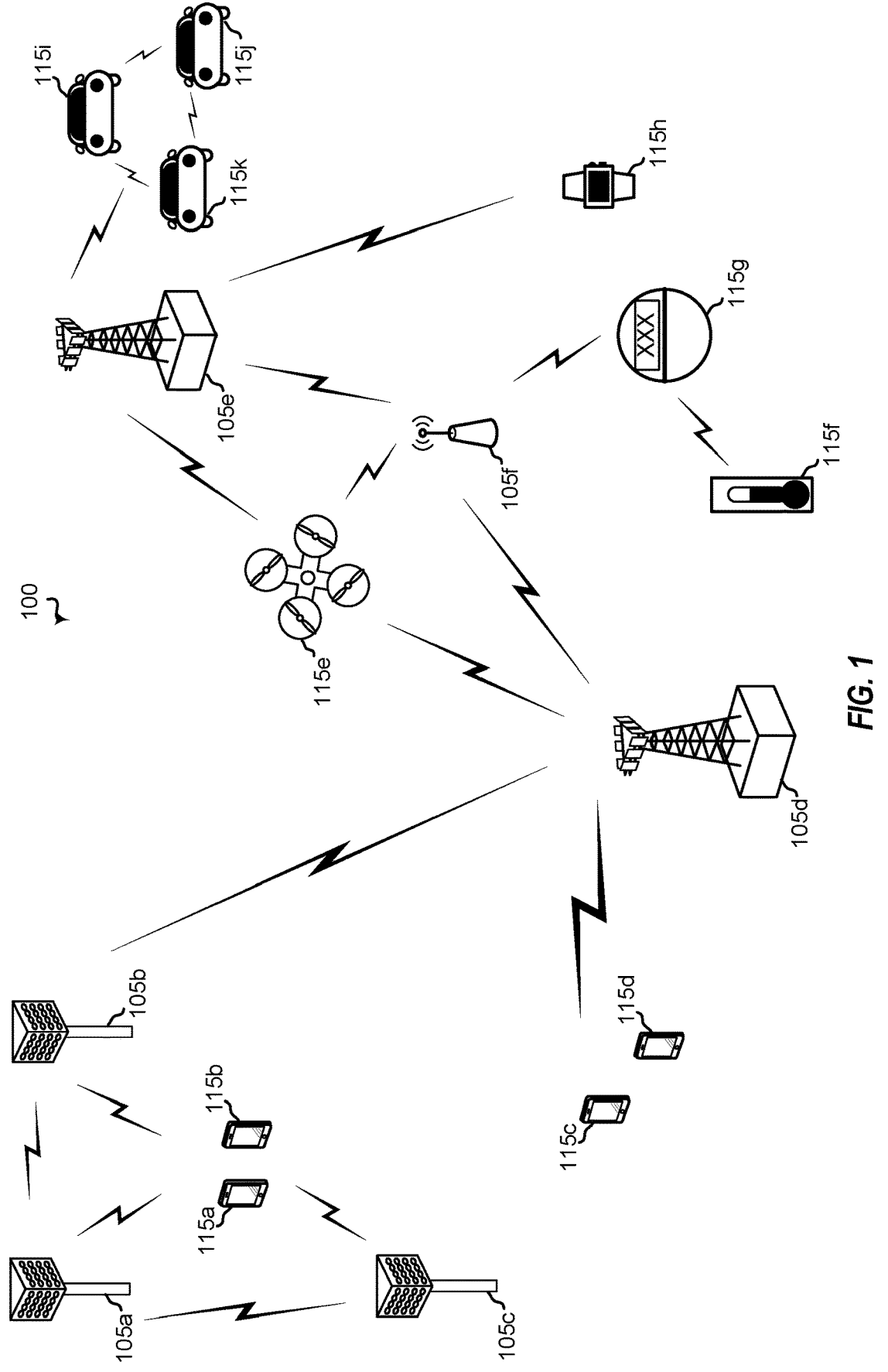
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology.

Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
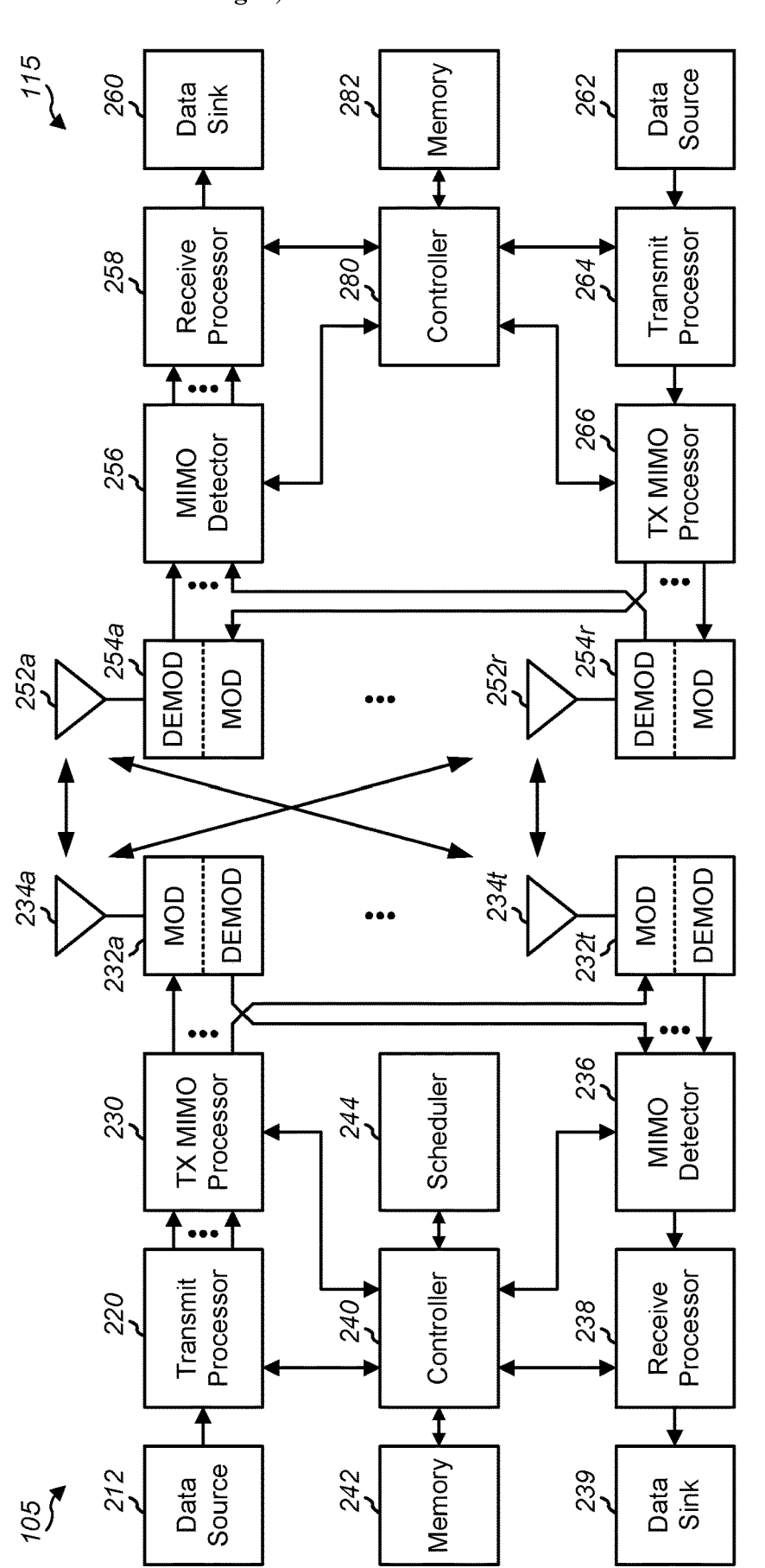
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current wireless communication systems, various types of UEs may be deployed and/or used. These various types of UEs may include devices with different levels of processing capabilities and/or antennas. For example, UEs may have different and varying number of antennas and different processing capabilities. As, these UEs may operate multiple processing units or receive (Rx) chains without much dif-ficulty. Typically, each Rx chain may support up to four layers or a port combination of four antennas, although some UEs with substantial processing capabilities may operate with larger Rx chains. For example, high tier UEs (e.g., Type 1 UEs) may have 6/8 Rx antennas and may be capable for supporting a full 8 layer Rx chain in which all antennas may be used in a single Rx chain. Middle tier UEs (e.g., Type 2 UEs) may also have 6/8 Rx antennas, but unlike high tier UEs may only support a four-antenna port combination for each Rx chain. In these cases, for rank equal to or smaller than four, in which case four or less antennas may be used, a single Rx chain (e.g., a single processing unit) may be used. However, in these cases, for rank greater than four, in which case more than four antennas may be used, two Rx chains (e.g., each Rx chain support up to a four-antenna port combination) may be used. Low tier UEs (e.g., Type 3 UEs) may operate with 4 receive antennas and a single Rx chain that supports a port antenna combination of up to four antennas.

Some example scenarios in which multi-RX chains opera-tions are implemented may include log likelihood ratio (LLR) combining operations. In these implementations, Rx antennas may be grouped (e.g., into more than one group). Downlink signals received from a base station (or sidelink transmissions received from a sidelink UE), may be pro-cessed separately for each group. For example, in a con-figuration using eight Rx antennas, two Rx chains, each with a port combination of four Rx antennas, may be configured. In this example, a UE may receive a downlink transmission from a base station and may process the downlink transmis-sion at each of the two Rx chains. At each of the two Rx chains, the processing may include performing a channel estimation and demodulating the downlink transmission, which may include computing the LLR in the demodulation. The LLR results of each processing Rx chain may then be combined and process through a decoder to decode the downlink transmission by the UE.

Another example scenario in which multi-RX chains operations are implemented may include implementations of multiple links within one carrier operations. In this case, Rx antennas may be grouped (e.g., into more than one group). Downlink signals received from a base station (or sidelink transmissions received from a sidelink UE), may be pro-cessed and decoded separately for each group, thereby providing multiple links within a single carrier. For example, in a configuration using eight Rx antennas, two Rx chains, each with a port combination of four Rx antennas, may be configured. In this example, a UE may receive a downlink transmission from a base station over a link over a first Rx chain, and may process and decode the downlink transmis-sion at the first Rx chain. The UE may also receive a downlink transmission from a base station over a link over s second Rx chain, and may process and decode the down-link transmission at the second Rx chain.

In current implementations, a sounding reference signal (SRS) framework may be implemented to facilitate com-munications between a base station and a UE by providing information about channel conditions to facilitate channel estimation by the base station. The current SRS framework includes the UE initially reporting an SRS switching capa-bility to the base station. The SRS switching capability may be reported by the UE to the base station as an xTyR SRS switching capability report, indicating that the UE is capable of SRS transmission on x antenna ports over a total of y antennas, where y corresponds to all or a subset of the UE's total Rx antennas. In this manner, y may indicate the number of Rx chains at the UE. Put another way, UE may transmit an xTyR switching capability report to the base station indicating that the UE is capable of transmission on x antenna ports concurrently and reception over a total of y antenna ports concurrently. The UE may then transmit the SRS in accordance with the xTyR capability over a total of y antenna ports.

The base station, after receiving the xTyR SRS switching capability report and the SRS may perform channel estima-tion based on the SRS. For example, in its channel estima-tion, the base station may compute a channel based on the number of antenna ports at the base station * y. After the channel estimation, the base station may know the channel over all the sounded y antenna ports. Based on the channel estimation, the base station may perform precoding calcu-lations for the number of antenna ports at the base station * number of channel state information (CSI) ports. For example, the base station may calculate a precoder to use for a CSI-reference signal (RS) to be transmitted for each CSI port to the UE based on the on the channel estimate for the y antenna ports. The base station may then apply the precoding to the CSI-RS using the calculated precoder and may transmit the precoded CSI-RS to the UE.

The UE may perform channel estimation based on the precoded CSI-RS received from the base station and may generate at least a rank indicator (RI) and channel quality indicator (CQI) to be included in a CSI report to be sent to the base station for each CSI port. In some implementations, the UE may generate and send to the base station a channel state feedback (CSF) message providing channels state and/or quality information based on the precoded CSI-RS received by the UE.

The base station may schedule a downlink data transmis-sion to the UE based on the CSI report including the RI and CQI. In some implementations, the base station may, after performing the channel estimation based on the SRS received from the UE may perform the precoding calcula-tion based on the SRS and may use the calculated precoder to transmit the downlink data to the UE. In this case, the base station may signal the precoder to the UE with the downlink data transmission.

It is noted that in current implementations, the base station may assume that the UE will always use all y antenna ports reported in the xTyR SRS switching capability report for receiving the downlink data transmission. For example, after the UE reports the xTyR SRS switching capability, the UE may sound using an SRS all y antenna ports. The base station may receive and detect the y antenna ports, and assume that the UE will use all y antenna ports to receive the downlink data transmission. For example, y' being the antenna ports used by the UE to receive the downlink data transmission from the base station, the precoding calculated by the base station may match the downlink channel when y'=y. However, in some cases, even though the UE may sound all y SRS antenna ports in the SRS transmission, it may not be desired to use y antenna ports for receiving the downlink data transmission. In these cases, it may be more beneficial or desired to use y' antenna ports to receive the downlink data transmissions. However, in these cases, the mismatch between y and y' may create some issues. For example, in some cases, at the UE, y'>y antenna ports may be used in order to obtain better signal-to-noise ratio (SNR) gains. In this situation, however, when y' is small relative to a large y, the base station may be able to obtain the full channel in the channel estimation, but the precoding calcu-lated by the base station may not match the downlink channel (as there is currently no mechanism to indicate which y' is used by the UE to receive the downlink data transmission). In some cases, at the UE, y'<y antenna ports may be used. For example, in these cases, the UE may determine to turn off some Rx antennas or antenna ports, or some Rx chains, or may determine to use these Rx antennas, ports, or chains, for other purposes, such as to obtain power savings from using a smaller number of Rx chains or antenna ports, to free up Rx chains, and/or receive combining capabilities (e.g., for non-orthogonal demodulation reference signal (DMRS)). In this situation, however, the base station may not be able to obtain the full channel in the channel estimation and may be able to only obtain a partial channel, as there is a rank limitation due to the y and y' mismatch.

In the examples above, it will be appreciated that, if the base station does not know the value of y', and y'> or <y, then there may be a mismatch as described above. This may cause a capacity loss, as the base station may calculate the precoding of the downlink data transmission based on the total y SRS antenna ports in the xTyR SRS switching capability report. Moreover, if the base station does not know which y' antenna ports are used, there may also be a mismatch, as the base station may only know that y'=4 (in the example of a four layer Rx chain implementation), and the base station may calculate the precoding based on four y' random SRS antenna ports, leading to a capacity loss.

Currently, some solutions have been proposed for handling SRS switching capability reports. In particular, in some proposals, a flexible SRS switching capability report may be implemented, in which the base station indicates the UE's side SRS. In this implementations, for different bandwidth parts (BWP), different SRS switching capabilities may be configured. The base station may use the BWP switching to change the number of SRS ports based on the corresponding SRS switching capabilities configuration of the BWP to which the UE switches. Other potential solutions propose using a medium access control (MAC)-control element (CE) to update the number of SRS antenna ports, y, used by the UE when sounding the SRS. In this approach, the base station may update y within one BWP. However, despite the flexibility provided by these currently proposed solutions, there remain the problems associated with the y and y' mismatch described above.

In particular, as noted above, even if the number of SRS antenna ports (y) used by the UE to sound the SRS may be configured flexible and dynamically, as long as y is configured, the UE may need to use the same y as y' to receive every downlink data transmission (e.g., PDSCH) with different ranks or modulation and coding scheme (MCS) values. In addition, the inflexibility of the approach of not being able to use a y' different than y to receive downlink data transmissions (e.g., PDSCH) limits the power savings an performance that may be realized by the UE.

Various aspects of the present disclosure are directed to systems and methods that support mechanisms for base station-assisted UE antenna port selection in a wireless communication system. In aspects, a UE may be configured to transmit, to a base station, an SRS switching capability report indicating to the base station a number of receive antenna ports configured for the UE. For example, the UE may transmit an xTyR switching capability report to the base station indicating that the UE is capable of transmission on x antenna ports and reception over a total of y antenna ports. The UE may transmit an SRS to the base station, where the SRS transmission sounds the y antenna ports. The base station may select y' antenna ports from the y antenna ports for the UE to receive a subsequent downlink data transmission (e.g., a PDSCH transmission). The base station may indicate the selection of the y' antenna ports out of the reported y antenna ports by the UE based on a channel estimation performed by the base station based on the SRS transmission, or based on CSF provided by the UE to the base station. In some aspects, the UE may provide a recommendation as to desired y' antenna ports based on the Rx chain availability at the UE or based on a channel estimation performed by the UE. The base station may receive the indication and may determine the y' antenna ports based on the UE's recommendation.

In some aspects, the techniques described herein may be applicable in sidelink communication implementations. In these cases, the aspects and procedures described herein may operate in a similar manner in sidelink operations but with a transmitting UE in place of a base station, and with a receiving UE in place of the UE described herein.

In some aspects, a list of receiving combination matrices may be defined. The receiving combination matrices may be used by the UE to receive the downlink data transmission from the base station. In aspects, a receiving precoding matrix indicator (RPMI) may be indicated by the base station, and the UE may use the RPMI to determine a receiving combination matrix to use for receiving the downlink data transmission from the base station. The base station may indicate the RPMI to the UE via a mapping between receiving combination matrices and a DCI field. The mapping between the receiving combination matrices and the DCI field may be predefined (e.g., by IEEE standards or by an update in a MAC-CE). In some aspects, a new field in the DCI field may be defined to indicate the RPMI, and/or the RPMI field may reuse an existing transmit precoding matrix (TPMI) field.

FIG. 3 is a block diagram of an example wireless communications system 300 that supports mechanisms for base station-assisted UE antenna port selection in a wireless communication system according to one or more aspects of the present disclosure. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115 and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more modems 320 (hereinafter referred to collectively as "modem 320"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282. In aspects, a modem, as used herein, may refer to a combination of components (e.g., modulator and demodulators 254a-r, etc., as illustrated in FIG. 2 for UE 115) that may enable UE 115 to receive downlink transmissions from base station 105 and/or to transmit uplink transmissions to base station 105.

Memory 304 includes or is configured to store SRS manager 305 and port recommendation logic 306. In aspects, SRS manager 305 is configured to perform operations for configuring, generating, and transmitting SRS switching capability reports and SRS transmissions to base station 105 in accordance with aspects of the present disclosure. In aspects, port recommendation logic 306 is configured to perform operations for generating and signaling antenna port recommendations to base station 105. For example, port recommendation logic 306 may generate recommendations of which y' antenna ports UE 115 may desire to use for receiving a subsequent downlink transmission (e.g., a PDSCH transmission) from base station 105.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store port indication manager 360. Port indication manager 360 may be configured to perform operations for selecting and indicating y' antenna ports, out of y antenna ports reported by UE 115, for UE 115 to receive a downlink data transmission (e.g., a PDSCH transmission) in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

As noted above, wireless communications system 300 may comprise a sidelink communication implementation. In this case, the techniques described herein for base station-assisted UE antenna port selection may be applicable to the sidelink implementation. In such an example, however, the operations of base station 105, with respect to the antenna selection techniques described herein, may be performed by a transmitting UE (not shown). In that case, the transmitting UE may be configured to receive an SRS transmission from the receiving UE and to indicate an antenna port selection to the receiving UE.

During operation of wireless communications system 300, UE 115 transmits SRS switching capability report 370 to base station 105. In aspects, SRS switching capability report 370 may be reported as xTyR, where x indicates the number of antenna ports over which UE 115 may transmit concurrently and y indicates the number of antenna ports over which UE 115 may receive concurrently. In some aspects, y may correspond to all or a subset of UE 115's total Rx antennas. During operation of wireless communications system 300, UE 115 transmits SRS 372 to base station 105 in accordance with UE 115's SRS switching capabilities. For example, UE 115 may transmit SRS 372 sounding all y antenna ports indicated in SRS switching capability report 370.

In aspects, base station 105 may select y' antenna ports out of the reported y antenna ports and may indicate the selected y' antenna ports to UE 115 (e.g., via antenna ports indication 376) for UE 115 to receive downlink transmission 378 over the γ' antenna ports from base station 105. For example, during operation of wireless communications system 300, base station 105 transmits antenna ports indication 376 to UE 115.

Selecting the γ' antenna ports out of the reported y antenna ports may be based on SRS channel estimation by base station 105 or based on CSF provided by UE 115 to base station 105. For example, base station 105 may perform channel estimation based on the received SRS over the y antenna ports from UE 115. The channel estimation procedure by base station 105 may yield a result in which base station 105 may obtain knowledge about the channel for all the y antenna ports. Base station 105 may leverage this knowledge about the channel for all the y antenna ports to select the best y' antenna ports or the best y' antenna port combinations from y based on the channel estimate calculated from the SRS received for each of the y antenna ports. In some aspects, base station 105 may select all y antenna port as the γ' antenna ports (e.g., y'=y), and in some cases base station 105 may select a subset of the y antenna ports (e.g., y'<y).

In aspects, base station 105 may indicate the γ' antenna ports, selected based on the channel estimation based on the SRS, to UE 115 using various indications. In some aspects, base station 105 may indicate the selected y' antenna ports to UE 115 using a MAC-CE. In these aspects, base station 105 may transmit the indication in a MAC-CE to UE 115. The MAC-CE may be received by UE 115 at a particular time, with respect to a scheduling of the downlink data transmission 378, and/or with respect to a CSI report associated with a CSI-RS. In these cases, if the MAC-CE including the indication of the selected y' antenna ports from the base station is received by UE 115 at a time too late for UE 115 to use or configure to use the γ' antenna ports, then UE 115 may ignore the MAC-CE indication to use the γ' antenna ports for receiving downlink data transmission 378. For example, when the MAC-CE indication is received before the scheduling of downlink data transmission 378 or before the CSI report is scheduled to base station 105, then UE 115 may use the MAC-CE indication. However, when downlink data transmission 378 is scheduled before (e.g., when DCI scheduling downlink data transmission 378 is before) or when the CSI report is scheduled before the MAC-CE indication, then UE 115 may ignore the MAC-CE indication. In some aspects, UE 115 may ignore the MAC-CE indication when DCI scheduling downlink data transmission 378 or the CSI report is scheduled less than 3 milliseconds before the MAC-CE indication is received by UE 115.

In some aspects, the MAC-CE indication may include an indication of the antenna port combination to be used for UE for receiving downlink transmission 378 from base station 105. For example, the MAC-CE indication may include one or more SRS identification (ID). In this case, UE 115 may identify the antenna port(s) to use as y' antenna ports based on the one or more SRS ID, as UE 115 may know which antenna port(s) was/were sounded with the SRS(s) identified by the one or more SRS ID. In this manner, the SRS ID(s) in the MAC-CE may indicate the antenna port(s) to use.

In some aspects, the MAC-CE indication may identify an SRS index based on an SRS transmission order used by UE 115. In this case, the SRS index in the MAC-CE indication may specify to use the antenna port corresponding to the SRS whose transmission order from UE 115 corresponds to the SRS index. For example, where the SRS index is 2, the MAC-CE indication may indicate UE 115 to use the antenna port for y' corresponding to the SRS whose transmission order from UE 115 is two. In some aspects, more than one SRS indices may be indicate in the MAC-CE indication, in which case the y' antenna ports may include the antenna ports corresponding to the SRS(s) whose transmission order from UE 115 corresponds to the SRS indices.

In some aspects, the MAC-CE indication may identify the selected y' antenna ports based on a mapping between an antenna port combination and a DCI field. For example, at least one mapping table or codepoint may be indicated by the MAC-CE and the at least one mapping may be configured to include a mapping between a DCI field value and an antenna port combination. In these case, a DCI message from base station 105 to UE 115 may be used to identify a value for the DCI field. The value in the DCI field may map to a particular antenna port combination. In this manner, base station may indicate the antenna port combination corresponding to the selected y' antenna ports based on the DCI field and the mapping table. For example, Table 1 below illustrated a particular example of a mapping table for indicating an antenna port combination to indicate selected y' antenna ports in accordance with aspects of the present disclosure.

TABLE 1

Example Mapping Table

| DCI Field Value | Antenna Port Combination |
| --- | --- |
| 00 | Port 1234 |
| 01 | Port 5678 |
| 10 | Port 1256 |
| 11 | Port 3478 |

As shown in the example illustrated in Table 1, a value in the DCI field of 00 may indicate an antenna port combination of port 1234. In this case, an indication of a 00 in the DCI field by base station 105 to UE 115 may serve to indicate to the UE 115 that y' antenna ports include port 1234. In aspects, more than one, different, mapping tables may be configured and/or indicated by the MAC-CE indication. The different mapping tables may be based on the SRS switching capability of UE 115 and/or based on the UE CSI report.

In some aspects, base station 105 may indicate the selected y' antenna ports to UE 115 using a DCI message. In these aspects, base station 105 may transmit the indication in a DCI message to UE 115. For example, base station may transmit the y' antenna ports selection indication to UE 115 in a DCI together with a CSI-RS triggering or together with the scheduling of downlink data transmission 378 (e.g., a PDSCH transmission). In some cases, the DCI indication of the selected y' antenna ports may include a new DCI field in an existing DCI format, or may include reusing a DCI field, such as the antenna port field of existing DCI formats. As noted above, the DCI indication may include an indication of a value that is mapped to a MAC-CE indicated mapping table, as described above.

In aspects, selecting the y' antenna ports out of the reported y antenna ports may be based on CSF received by base station from UE 115. For example, base station 105 may receive the SRS over the y antenna ports from UE 115 and may perform channel estimation, as described above. Base station 105 may configure and/or transmit a plurality of precoded CSI-RS to UE 115, each precoded CSI-RS precoded using a different precoder. In some aspects, the plurality of precoded CSI-RS may be triggered together. For example, the plurality of precoded CSI-RS may be configured in the same resources set or by a same CSI-Aperiod-icTriggerStateList parameter.

In some aspects, each of the precoded CSI-RS of the plurality of precoded CSI-RS may correspond to a different Rx antenna port combination of UE 115, in accordance with the xTyR SRS switching capability report and the SRS transmission over the y antenna ports. For example, N precoded CSI-RS may be configured using N precoders, each corresponding to a different Rx antenna port combination. In some aspects, the mapping between each of the precoded CSI-RS of the plurality of precoded CSI-RS to a different Rx antenna port combination of UE 115 may be predefined, such as by an radio resource control (RRC) command and/or a MAC-CE update by base station 105 to UE 115. For example, an RRC predefined rule may specify that a first precoder corresponds to a first antenna port combination, a second precoder corresponds to a second antenna port combination, and so on up to an Nth precoder corresponding to an Nth antenna port combination. In some cases, a MAC-CE may be used to indicate a mapping table mapping each precoder of the N precoders to an antenna port combination.

UE 115 may receive the plurality of precoded CSI-RS and may generate CSF for the received precoded CSI-RS. In aspects, UE 115 may report, in the CSF, the performance of the differently precoded CSI-RS to determine which CSI-RS may provide best performance, and UE 115 may report this performance of the different precoders to base station 105 so that base station 105 may select a best performing precoder for precoding downlink transmission 378.

In some aspects, UE 115 may generate, configure, and/or transmit a single CSI report for the plurality of precoded CSI-RS. For example, UE 115 may generate an RI and a CSI-RS resource indicator (CRI) to be reported to base station 105, and may perform one CSF based on the reported RI and CRI. In aspects, when the rank determined by UE 115 for the CSF is <y', y' being y' antenna ports desired by UE 115 to be used by UE 115 to receive downlink data transmission 378, UE may determine to use a single UE like precoder for the CSI report. However, when the rank determined by UE 115 for the CSF is >y', UE 115 may determine to require more receive antennas for receiving downlink data transmission 378 over the γ' antenna ports, and UE 115 may use a multiple UE like precoder, so that UE 115 may transmit the CSI report with different precoders.

In some aspects, UE 115 may generate, configure, and/or transmit multiple CSI reports for the plurality of precoded CSI-RS. For example, UE 115 may report a CSI report for each CSI-RS of the plurality of precoded CSI-RS. As noted above, each CSI-RS of the plurality of precoded CSI-RS may correspond to a different Rx antenna port combination.

In aspects, once UE 115 has transmitted the CSI report or CSI reports to base station 105, base station 105 may select one of the precoders used to precode each of the plurality of precoded CSI-RS transmitted to UE 115 from base station 105. In some aspects, the selected precoder may represent the best performing precoder. For example, based on the CSI reports or reports received from UE 115, base station 105 may determine which of the precoders used to precode each of the plurality of precoded CSI-RS transmitted to UE 115 performs best. Base station 105 may use the selected precoder to precode a CSI-RS that is transmitted to UE 115. The precoded CSI-RS transmitted to UE 115 may correspond to an Rx antenna port combination, and may thus serve as an indication to UE 115 of the selected y' antenna port combination (e.g., the selected y' antenna port combination being the antenna port combination corresponding to the best performing precoder selected by base station 105). In aspects, base station 105 may also precode downlink data transmission 378 using the selected precoder and transmit downlink data transmission 378 to UE 115.

As will be appreciated from the above, UE 115 may report the best performing precoders, and in this manner may make a recommendation as to which Rx antenna port combination may be selected as y' antenna ports by base station 105. Base station 105 may use UE 115's recommendation, or may make a different selection.

During operation of wireless communications system 300, base station 105 transmits downlink data transmission 378 to UE 115. For example, base station 105 may transmit downlink data transmission 378 to UE 115, and UE 115 may receive downlink data transmission 378 using the γ' antenna ports selected in accordance with the foregoing.

In aspects, a mechanism for a UE-triggered SRS switching capability update may be provided. For example, after UE 115 may provide an SRS switching capability report to base station 105, UE 115 may determine to turn off at least one Rx antenna port or Rx chain, or at least one Rx antenna port or Rx chain may become unavailable. In this case, UE 115 may determine to update the SRS switching capability report, as there may be a mismatch between the reported capabilities and the available Rx chains. In aspects, UE 115 may update the SRS switching capability report by including the updated xTyR report in a new hybrid automatic repeat request (HARQ) and/or scheduling request field. In some aspects, a new CSI report type may be provided that includes an indication to base station 105 from UE 115 whether the SRS switching capability is to be updated or remain the same. In some aspects, for some priorities of CSI-RS, base station 105 may notify UE 115 that the new CSI report type may be used for SRS switching capability updates. In this case, UE 115 may use the new CSI report type to update the SRS switching capability for a CSI-RS of the identified priority. In either case, after receiving the SRS switching capability report update, base station 105 may indicate a new SRS switching setting and may update the number of y' antenna ports to be used for receiving downlink data transmissions by UE 115. In some aspects, more than one SRS switching capability configurations may be configured for UE 115 (e.g., 1T8R and IT4R) in one BWP. In these cases, a predefined mapping of the different SRS switching capability configurations may be used to signal the SRS switching capability update. For example, after base station 105 may indicate the selected y' antenna port combination, SRS may be switched over to one of the configured SRS switching capability configurations.

In aspects, a list of receiving combination matrices may be defined. The receiving combination matrices may be used to indicate, in addition to the γ' antenna port combination indication to be used for receiving the downlink data transmission, a matrix to use for receiving the downlink data transmission. For example, the receiving combination matrices may be used by the UE to receive the downlink data transmission from the base station. In aspects, using the receiving combination matrices may serve as an antenna port selection codebook or antenna port selection precoder. In this manner, in addition to antenna port selection, the techniques herein provide more detail on how to combine the selected antenna ports. For example, instead of merely providing a selected antenna port combination, a receiving combination matrix may allow us to select the antenna port combination based on some parameter, and this manner provides more flexibility. In aspects, an RPMI may be indicated by the base station, and the UE may use the RPMI to determine a receiving combination matrix to use for receiving the downlink data transmission from the base station. The base station may indicate the RPMI to the UE via a mapping between receiving combination matrices and a DCI field. The mapping between the receiving combination matrices and the DCI field may be predefined (e.g., by IEEE standards or by an update in a MAC-CE). In some aspects, a new field in the DCI field may be defined to indicate the RPMI, and/or the RPMI field may reuse an existing TPMI field.

Figure 6:
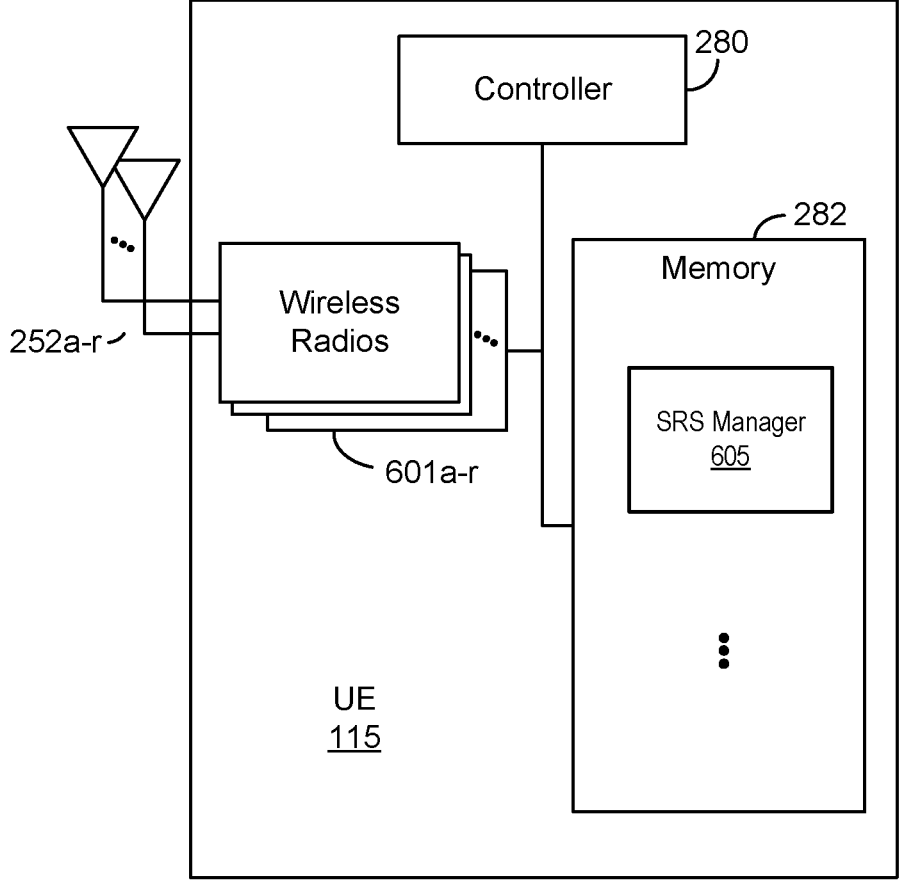
FIG. 6 is a block diagram of an example UE that supports mechanisms for base station-assisted UE antenna port selection according to one or more aspects.

FIG. 4 is a flow diagram illustrating an example process 400 that supports mechanisms for base station-assisted UE antenna port selection in a wireless communication system according to one or more aspects of the present disclosure. Operations of process 400 may be performed by a UE, such as UE 115 described above with reference to FIGS. 1-3, or UE 115 with reference to FIG. 6. For example, example operations (also referred to as "blocks") of process 400 may enable UE 115 to support mechanisms for base station-assisted UE antenna port selection. FIG. 6 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2 for UE 115, including modulator/demodulators 254a-r, MIMO detector 256, receive processor 258, transmit processor 264, and TX MIMO processor 266.

At block 402 of process 400, a UE (e.g., UE 115) transmits, to a base station (e.g., base station 105), an SRS switching capability report indicating a first number of receive antenna ports configured for the UE to receive downlink data transmission. In order to implement the functionality for such operations, UE 115, under control of controller/processor 280, executes SRS manager 605, stored in memory 282. The functionality implemented through the execution environment of SRS manager 605 allows for UE 115 to perform switching capability report related operations according to the various aspects herein. In aspects, the SRS switching capability report may be reported as xTyR, where x indicates the number of antenna ports over which UE 115 may transmit concurrently and y indicates the number of antenna ports over which UE 115 may receive concurrently. In some aspects, y may correspond to all or a subset of UE 115's total Rx antennas.

At block 404 of process 400, UE 115 transmits, to base station 105, one or more SRS over the first number of receive antenna ports. In order to implement the functionality for such operations, UE 115, under control of controller/processor 280, may transmit one or more SRS over the first number of receive antenna ports via wireless radios 601a-r and antennas 252a-r. In aspects, the one or more SRS may be transmitted using one or more SRS resources, and each SRS resource of the one or more SRS resources may include one or more symbols. In aspects, transmitting the one or more SRS may include sounding all y antenna ports indicated in the SRS switching capability report.

At block 406 of process 400, UE 115 receives, from base station 105, an indication of a second number of receive antenna ports for receiving the downlink data transmission from base station 105. In order to implement the functionality for such operations, UE 115, under control of controller/processor 280, may receive an indication of a second number of receive antenna ports for receiving the downlink data transmission from base station 105 via wireless radios 601a-r and antennas 252a-r.

In aspects, the indication of the second number of receive antenna ports may be received in a MAC-CE. The indication in the MAC-CE may include one or more SRS IDs, each SRS ID associated with a respective SRS corresponding to a receive antenna port combination. In these cases, the second number of receive antenna ports may include the corresponding receive antenna port combination. In some aspects, the indication in the MAC-CE may include one or more SRS indices, each SRS index associated with a respective SRS transmitted in a transmission order corresponding to the each SRS index. In these cases, the second number of receive antenna ports may include a receive antenna port combination over which the respective SRS is transmitted to the base station.

In some aspects, the MAC-CE may include one or more mapping tables mapping at least one value of a field in a DCI message to a receive antenna port combination. UE 115 may be configured to receive the DCI message from base station 105 including a value for the field in the DCI message. In these cases, the second number of receive antenna ports may include the receive antenna port combination to which the value for the field in the DCI message is mapped by the one or more mapping tables.

In aspects, the indication of the second number of receive antenna ports may be received in a DCI message. The DCI message may be received together with a triggering of a CSI-RS, and/or or a scheduling of the downlink data transmission.

In aspects, the indication of the second number of receive antenna ports may include a plurality of CSI-RS. Each CSI-RS of the plurality of CSI-RS may be precoded with a different precoder, and each of the different precoders may correspond to a different receive antenna port combination of UE 115. UE 115 may be configured to transmit CSF for the plurality of CSI-RS to the base station. In aspects, receiving the indication of the second number of receive antenna ports may include receiving, from base station 105, a precoded CSI-RS corresponding to a receive antenna port combination including the second number of receive antenna ports. In aspects, transmitting the CSF for the plurality of CSI-RS to base station 105 may include generating a single CSF report for the plurality of CSI-RS, and/or generating a CSF report for each CSI-RS of the plurality of CSI-RS.

The single CSF report may include a reported rank indicator and a reported CRI.

At block 408 of process 400, UE 115 receives from the base station, the downlink data transmission from base station 105 over the second number of receive antenna ports. In order to implement the functionality for such operations, UE 115, under control of controller/processor 280, may receive the downlink data transmission from base station 105 over the second number of receive antenna ports via wireless radios 1001a-r and antennas 252a-r.

In aspects, UE 115 may transmit an indication to update the SRS switching capability report to base station 105. Base station 105 may update the SRS switching capability of UE 115 in response to receiving the SRS switching capability report update. In aspects, base station 105 may update the SRS switching capability of the UE by updating the second number of receive antenna ports for the UE to receive the downlink data transmission.

In aspects, UE 115 may receive an RPMI from base station 105 indicating a receive combination matrix to be used for receiving the downlink data transmission from base station 105 over the second number of receive antenna ports. In aspects, receiving the RPMI may include receiving the RPMI in a DCI message. The RPMI may be mapped to a receive combination matrix in a mapping table mapping different RPMI values to different receive combination matrices.

Figure 7:
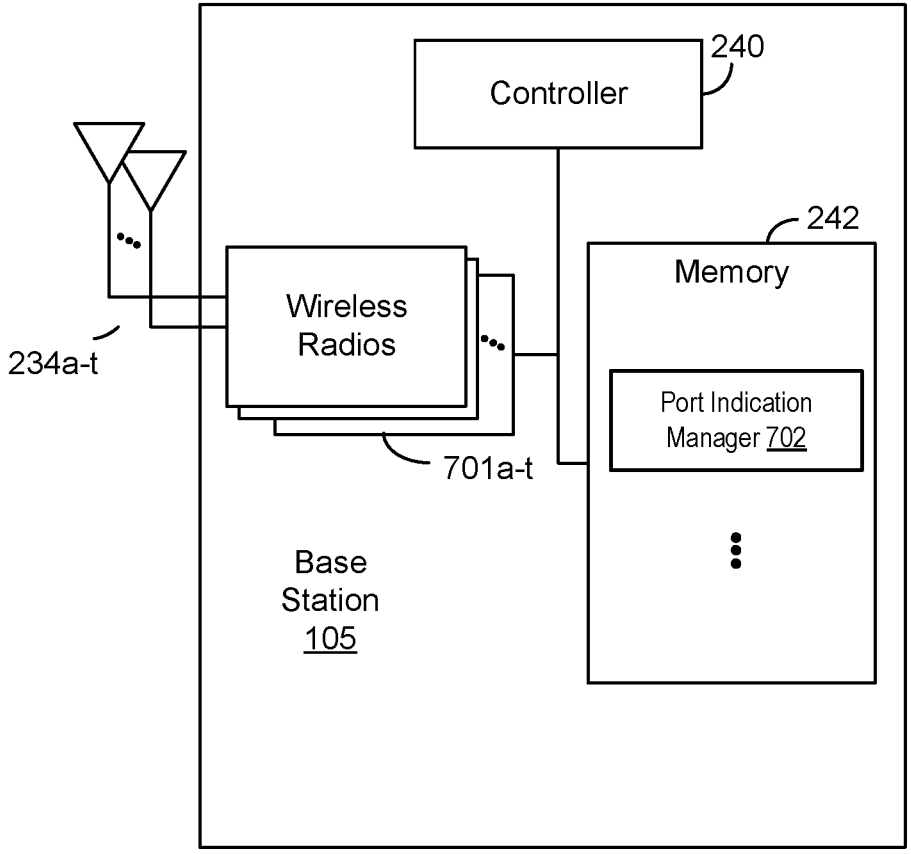
FIG. 7 is a block diagram of an example base station that supports mechanisms for base station-assisted UE antenna port selection according to one or more aspects.

FIG. 5 is a block diagram illustrating an example an example process 500 that supports mechanisms for base station-assisted UE antenna port selection in a wireless communication system according to one or more aspects. Operations of process 500 may be performed by a base station, such as base station 105 described above with reference to FIGS. 1-3, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502, a base station (e.g., base station 105) receives, from a UE (e.g., UE 115), an SRS switching capability report indicating a first number of receive antenna ports configured for the UE to receive downlink data transmission. In order to implement the functionality for such operations, the base station, under control of controller/processor 240, may receive, from UE 115, the SRS switching capability report indicating a first number of receive antenna ports configured for UE 115 to receive downlink data transmission via wireless radios 701a-r and antennas 234a-t. In aspects, the SRS switching capability report may be reported by UE 115 as xTyR, where x indicates the number of antenna ports over which UE 115 may transmit concurrently and y indicates the number of antenna ports over which UE 115 may receive concurrently. In some aspects, y may correspond to all or a subset of UE 115's total Rx antennas.

At block 504, base station 105 receives, from UE 115, one or more SRS transmitted over the first number of receive antenna ports. In order to implement the functionality for such operations, the base station, under control of controller/processor 240, may receive, from UE 115, the one or more SRS transmitted over the first number of receive antenna ports via wireless radios 701a-r and antennas 234a-t. In aspects, the one or more SRS may be received from UE 115 over one or more SRS resources, and each SRS resource of the one or more SRS resources may include one or more symbols. In aspects, the one or more SRS may include a sounding by UE 115 of all y antenna ports indicated in the SRS switching capability report.

At block 506, base station 105 transmits, to UE 115, an indication of a second number of receive antenna ports for the UE to receive the downlink data transmission. In order to implement the functionality for such operations, base station 105, under control of controller/processor 240, executes port indication manager 702, stored in memory 242. The functionality implemented through the execution environment of port indication manager 702 allows for base station 105 to perform antenna port selection and indication operations according to the various aspects herein.

In aspects, base station 105 may perform channel estimation based on the one or more SRS transmitted over the first number of receive antenna ports from UE 115. Base station 105 may then select the second number of receive antenna ports for UE 115 to receive the downlink data transmission based on the channel estimation for the first number of receive antenna ports.

Base station 105 may transmit the indication of the second number of receive antenna ports in a MAC-CE. The indication in the MAC-CE may include one or more SRS IDs, each SRS ID associated with a respective SRS corresponding to a receive antenna port combination. In these cases, the second number of receive antenna ports may include the corresponding receive antenna port combination. In some aspects, the indication in the MAC-CE may include one or more SRS indices, each SRS index associated with a respective SRS transmitted in a transmission order corresponding to the each SRS index. In these cases, the second number of receive antenna ports may include a receive antenna port combination over which the respective SRS is transmitted to the base station.

In some aspects, the MAC-CE may include one or more mapping tables mapping at least one value of a field in a DCI message to a receive antenna port combination. Base station 105 may be configured to transmit the DCI message to UE 115 including a value for the field in the DCI message. In these cases, the second number of receive antenna ports may include the receive antenna port combination to which the value for the field in the DCI message is mapped by the one or more mapping tables.

In aspects, the indication of the second number of receive antenna ports may be transmitted in a DCI message. The DCI message may be transmitted together with a triggering of a CSI-RS, and/or a scheduling of the downlink data transmission.

In aspects, the indication of the second number of receive antenna ports may include a plurality of CSI-RS. Base station 105 may precode each CSI-RS of the plurality of CSI-RS with a different precoder, each of the different precoders corresponding to a different receive antenna port combination of UE 115. Base station 105 may transmit the plurality of CSI-RS to UE 115, and a CSF may be received from UE 115 for the plurality of CSI-RS. Base station 105 may select a precoder from the different precoders used to precode each CSI-RS of the plurality of CSI-RS based on the received CSF. Base station 105 may transmit a precoded CSI-RS precoded with the selected precoder corresponding to a receive antenna port combination including the second number of receive antenna ports. In aspects, the CSF received for the plurality of CSI-RS from UE 115 may include a single CSF report for the plurality of CSI-RS, and/or may include a CSF report for each CSI-RS of the plurality of CSI-RS. The single CSF report may include a reported rank indicator and a reported CRI.

At block 508, base station 105 transmits the downlink data transmission from to be received over the second number of receive antenna ports by UE 115. In order to implement the functionality for such operations, the base station, under control of controller/processor 240, may transmit the downlink data transmission to UE 115 via wireless radios 701a-r and antennas 234a-t.

In aspects, base station 105 may receive an indication to update the SRS switching capability report from UE 115. Base station 105 may update the SRS switching capability of UE 115 in response to receiving the SRS switching capability report update. In aspects, base station 105 may update the SRS switching capability of UE 115 by updating the second number of receive antenna ports for UE 115 to receive the downlink data transmission.

In aspects, base station 105 may transmit an RPMI to UE 115 indicating a receive combination matrix to be used for receiving the downlink data transmission from base station 105 over the second number of receive antenna ports. In aspects, transmitting the RPMI may include transmitting the RPMI in a DCI message. The RPMI may be mapped to a receive combination matrix in a mapping table mapping different RPMI values to different receive combination matrices.

In one or more aspects, techniques for supporting cross-slot scheduling of sidelink transmissions in a wireless communication system according to one or more aspects may include additional aspects, such as any single aspect or any combination of aspects described below or in connection with one or more other processes or devices described elsewhere herein. In a first aspect, supporting cross-slot scheduling of sidelink transmissions in a wireless communication system may include an apparatus configured to transmit, to a base station, an SRS switching capability report indicating a first number of receive antenna ports configured for the UE to receive downlink data transmission, and to transmit, to the base station, one or more SRS over the first number of receive antenna ports. In aspects, the one or more SRS is transmitted using one or more SRS resources, and each SRS resource of the one or more SRS resources includes one or more symbols. The apparatus is also configured to receive, from the base station, an indication of a second number of receive antenna ports for receiving the downlink data transmission from the base station, and to receive, from the base station, the downlink data transmission from the base station over the second number of receive antenna ports. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, receiving the indication of the second number of receive antenna ports includes receiving MAC-CE.

In a third aspect, alone or in combination with one or more of the first aspect or the second aspect, the MAC-CE includes one or more SRS IDs, each SRS ID of the SRS IDS associated with a respective SRS corresponding to a receive antenna port combination.

In a fourth aspect, alone or in combination with the third aspect, the second number of receive antenna ports includes the corresponding receive antenna port combination.

In a fifth aspect, alone or in combination with one or more of the third aspect through the fourth aspect, the MAC-CE includes one or more SRS indices, each SRS index of the SRS index associated with a respective SRS transmitted in a transmission order corresponding to the each SRS index.

In a sixth aspect, alone or in combination with one or more of the third aspect through the fifth aspect, the second number of receive antenna ports includes a receive antenna port combination over which the respective SRS is transmitted to the base station.

In a seventh aspect, alone or in combination with one or more of the first aspect through the sixth aspect, the MAC-CE includes one or more mapping tables mapping at least one value of a field in a DCI message to a receive antenna port combination.

In an eighth aspect, alone or in combination with the seventh aspect, the techniques of the first aspect include receiving the DCI message from the base station including a value for the field in the DCI message.

In a ninth aspect, alone or in combination with one or more of the seventh aspect through the eighth aspect, the second number of receive antenna ports includes the receive antenna port combination to which the value for the field in the DCI message is mapped by the one or more mapping tables.

In a tenth aspect, alone or in combination with one or more of the first aspect through the ninth aspect, receiving the indication of the second number of receive antenna ports includes receiving a DCI message.

In an eleventh aspect, alone or in combination with one or more of the first aspect through the tenth aspect, the DCI message is received together with a triggering of a CSI-RS.

In a twelfth aspect, alone or in combination with the eleventh aspect, the DCI message is received together with a scheduling of the downlink data transmission.

In a thirteenth aspect, alone or in combination with one or more of the first aspect through the twelfth aspect, receiving the indication of the second number of receive antenna ports includes receiving a plurality of CSI-RS.

In a fourteenth aspect, alone or in combination with one or more of the first aspect through the thirteenth aspect, receiving the indication of the second number of receive antenna ports includes transmitting CSF for the plurality of CSI-RS to the base station.

In a fifteenth aspect, alone or in combination with one or more of the first aspect through the fourteenth aspect, receiving the indication of the second number of receive antenna ports further includes receiving, from the base station, a precoded CSI-RS corresponding to a receive antenna port combination including the second number of receive antenna ports.

In a sixteenth aspect, alone or in combination with one or more of the first aspect through the fifteenth aspect, each CSI-RS of the plurality of CSI-RS is precoded with a different precoder.

In a seventeenth aspect, alone or in combination with the sixteenth aspect, each of the different precoder corresponds to a different receive antenna port combination of the UE.

In an eighteenth aspect, alone or in combination with one or more of the first aspect through the seventeenth aspect, transmitting the CSF for the plurality of CSI-RS to the base station includes generating a single CSF report for the plurality of CSI-RS.

In a nineteenth aspect, alone or in combination with the eighteenth aspect, the single CSF report includes a reported rank indicator and a reported CRI.

In a twentieth aspect, alone or in combination with one or more of the first aspect through the nineteenth aspect, transmitting the CSF for the plurality of CSI-RS to the base station includes generating a CSF report for each CSI-RS of the plurality of CSI-RS.

In a twenty-first aspect, alone or in combination with one or more of the first aspect through the twentieth aspect, the techniques of the first aspect include transmitting, to the base station, an indication to update the SRS switching capability report.

In a twenty-second aspect, alone or in combination with one or more of the first aspect through the twenty-first aspect, the techniques of the first aspect include receiving, from the base station, an RPMI indicating a receive combination matrix to be used for receiving the downlink data transmission from the base station over the second number of receive antenna ports.

In a twenty-third aspect, alone or in combination with one or more of the first aspect through the twenty-second aspect, receiving the RPMI includes receiving the RPMI in a DCI message.

In a twenty-fourth aspect, alone or in combination with the twenty-third aspect, the RPMI is mapped to a receive combination matrix in a mapping table, the mapping table mapping different RPMI values to different receive combination matrices.

In a twenty-fifth aspect, supporting managing allocations of CG resources for uplink transmissions using a polynomial over Galois field in a wireless communication system may include an apparatus configured to receive, from a UE, an SRS switching capability report indicating a first number of receive antenna ports configured for the UE to receive downlink data transmission, and to receive, from the UE, one or more SRS transmitted over the first number of receive antenna ports. In aspects, the one or more SRS is received over one or more SRS resources, and each SRS resource of the one or more SRS resources includes one or more symbols. The apparatus is also configured to transmit, to the UE, an indication of a second number of receive antenna ports for the UE to receive the downlink data transmission, and to transmit, to the UE, the downlink data transmission from the base station to be received over the second number of receive antenna ports by the UE. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-sixth aspect, alone or in combination with one or more of the twenty-fifth aspect through the twenty-fifth aspect, the techniques of the twenty-fifth aspect include performing channel estimation based on the one or more SRS transmitted over the first number of receive antenna ports from the UE.

In a twenty-seventh aspect, alone or in combination with the twenty-sixth aspect, the techniques of the twenty-fifth aspect include selecting the second number of receive antenna ports for the UE to receive the downlink data transmission based on the channel estimation for the first number of receive antenna ports.

In a twenty-eighth aspect, alone or in combination with one or more of the twenty-fifth aspect through the twenty-seventh aspect, transmitting the indication of the second number of receive antenna ports includes transmitting a MAC-CE.

In a twenty-ninth aspect, alone or in combination with one or more of the twenty-fifth aspect through the twenty-eighth aspect, the MAC-CE includes one or more SRS IDs, each SRS ID of the SRS IDS associated with a respective SRS corresponding to a receive antenna port combination.

In a thirtieth aspect, alone or in combination with the twenty-ninth aspect, the second number of receive antenna ports includes the corresponding receive antenna port combination.

In a thirty-first aspect, alone or in combination with one or more of the twenty-ninth aspect through the thirtieth aspect, the MAC-CE includes one or more SRS indices, each SRS index of the SRS index associated with a respective SRS transmitted in a transmission order corresponding to the each SRS index.

In a thirty-second aspect, alone or in combination with one or more of the twenty-ninth aspect through the thirty-first aspect, the second number of receive antenna ports includes a receive antenna port combination over which the respective SRS is transmitted to the base station.

In a thirty-third aspect, alone or in combination with one or more of the twenty-fifth aspect through the thirty-second aspect, the MAC-CE includes one or more mapping tables mapping at least one value of a field in a DCI message to a receive antenna port combination.

In a thirty-fourth aspect, alone or in combination with the thirty-third aspect, the techniques of the twenty-fifth aspect include transmitting the DCI message to the UE including a value for the field in the DCI message.

In a thirty-fifth aspect, alone or in combination with one or more of the thirty-third aspect through the thirty-fourth aspect, the second number of receive antenna ports includes the receive antenna port combination to which the value for the field in the DCI message is mapped by the one or more mapping tables.

In a thirty-sixth aspect, alone or in combination with one or more of the twenty-fifth aspect through the thirty-fifth aspect, transmitting the indication of the second number of receive antenna ports includes transmitting a DCI message.

In a thirty-seventh aspect, alone or in combination with one or more of the twenty-fifth aspect through the thirty-sixth aspect, the DCI message is transmitted together with a triggering of a CSI-RS.

In a thirty-eighth aspect, alone or in combination with the thirty-seventh aspect, the DCI message is transmitted together with a scheduling of the downlink data transmission.

In a thirty-ninth aspect, alone or in combination with one or more of the twenty-fifth aspect through the thirty-eighth aspect, transmitting the indication of the second number of receive antenna ports includes transmitting a plurality of CSI-RS.

In a fortieth aspect, alone or in combination with the thirty-ninth aspect, transmitting the indication of the second number of receive antenna ports includes receiving CSF for the plurality of CSI-RS from the UE.

In a forty-first aspect, alone or in combination with one or more of the thirty-ninth aspect through the fortieth aspect, transmitting the indication of the second number of receive antenna ports includes selecting a precoder from the different precoders used to precode each CSI-RS of the plurality of CSI-RS based on the received CSF.

In a forty-second aspect, alone or in combination with one or more of the twenty-fifth aspect through the forty-first aspect, transmitting the indication of the second number of receive antenna ports further includes transmitting, to the UE, a CSI-RS precoded with the selected precoder corresponding to a receive antenna port combination including the second number of receive antenna ports.

In a forty-third aspect, alone or in combination with one or more of the twenty-fifth aspect through the forty-second aspect, each CSI-RS of the plurality of CSI-RS precoded with a different precoder.

In a forty-fourth aspect, alone or in combination with the forty-third aspect, each of the different precoder corresponding to a different receive antenna port combination of the UE.

In a forty-fifth aspect, alone or in combination with one or more of the twenty-fifth aspect through the forty-fourth aspect, receiving the CSF for the plurality of CSI-RS from the UE includes receiving a single CSF report for the plurality of CSI-RS.

In a forty-sixth aspect, alone or in combination with the forty-fifth aspect, the single CSF report includes a reported rank indicator and a reported CRI.

In a forty-seventh aspect, alone or in combination with one or more of the forty-fifth aspect through the forty-sixth aspect, receiving the CSF for the plurality of CSI-RS from the UE includes receiving a CSF report for each CSI-RS of the plurality of CSI-RS.

In a forty-eighth aspect, alone or in combination with one or more of the twenty-fifth aspect through the forty-seventh aspect, the techniques of the twenty-fifth aspect include receiving, from the UE, an indication to update the SRS switching capability.

In a forty-ninth aspect, alone or in combination with the forty-eighth aspect, the techniques of the twenty-fifth aspect include updating the SRS switching capability of the UE.

In a fiftieth aspect, alone or in combination with one or more of the forty-eighth aspect through the forty-ninth aspect, updating the SRS switching capability of the UE includes updating the second number of receive antenna ports for the UE to receive the downlink data transmission.

In a fifty-first aspect, alone or in combination with one or more of the twenty-fifth aspect through the fiftieth aspect, the techniques of the twenty-fifth aspect include transmitting, to the UE, an RPMI indicating a receive combination matrix to be used by the UE for receiving the downlink data transmission over the second number of receive antenna ports of the UE.

In a fifty-second aspect, alone or in combination with the fifty-first aspect, transmitting the RPMI includes transmitting the RPMI in a DCI message.

In a fifty-third aspect, alone or in combination with one or more of the fifty-first aspect through the fifty-second aspect, the RPMI is mapped to a receive combination matrix in a mapping table, the mapping table mapping different RPMI values to different receive combination matrices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

transmitting, to a base station, a sounding reference signal (SRS) switching capability report indicating a first number of receive antenna ports configured for the UE to receive downlink data transmission;

transmitting, to the base station, one or more SRS over the first number of receive antenna ports, wherein the one or more SRS is transmitted using one or more SRS resources, each SRS resource of the one or more SRS resources including one or more symbols;

receiving, from the base station, an indication of a second number of receive antenna ports for receiving the downlink data transmission from the base station;

receiving, from the base station, the downlink data transmission from the base station over the second number of receive antenna ports; and receiving, from the base station, a receive precoding matric indicator (RPMI) indicating a receive combination matrix to be used for receiving the downlink data transmission from the base station over the second number of receive antenna ports.

2. The method of claim 1, wherein receiving the indication of the second number of receive antenna ports includes receiving a medium access control (MAC)-control element (CE).

3. The method of claim 2, wherein the MAC-CE includes one or more of:

one or more SRS identifications (IDs), each SRS ID of the SRS IDS associated with a respective SRS corresponding to a receive antenna port combination, wherein the second number of receive antenna ports includes the corresponding receive antenna port combination; or one or more SRS indices, each SRS index of the SRS index associated with a respective SRS transmitted in a transmission order corresponding to the each SRS index, wherein the second number of receive antenna ports includes a receive antenna port combination over which the respective SRS is transmitted to the base station.

4. The method of claim 2, wherein the MAC-CE includes one or more mapping tables mapping at least one value of a field in a downlink control information (DCI) message to a receive antenna port combination, and further comprising:

receiving the DCI message from the base station including a value for the field in the DCI message, wherein the second number of receive antenna ports includes the receive antenna port combination to which the value for the field in the DCI message is mapped by the one or more mapping tables.

5. The method of claim 1, wherein receiving the indication of the second number of receive antenna ports includes receiving a downlink control information (DCI) message.

6. The method of claim 5, wherein the DCI message is received together with one or more of:

a triggering of a channel state information (CSI)-reference signal (RS); or a scheduling of the downlink data transmission.

7. The method of claim 1, wherein receiving the indication of the second number of receive antenna ports includes:

receiving a plurality of channel state information (CSI)-reference signals (RS); and transmitting channel state feedback (CSF) for the plurality of CSI-RS to the base station.

8. The method of claim 7, wherein receiving the indication of the second number of receive antenna ports further includes receiving, from the base station, a precoded CSI-RS corresponding to a receive antenna port combination including the second number of receive antenna ports.

9. The method of claim 7, wherein each CSI-RS of the plurality of CSI-RS is precoded with a different precoder, and wherein each of the different precoder corresponds to a different receive antenna port combination of the UE.

10. The method of claim 7, wherein transmitting the CSF for the plurality of CSI-RS to the base station includes one of:

generating a single CSF report for the plurality of CSI-RS, wherein the single CSF report includes a reported rank indicator and a reported CSI-RS resource indicator (CRI); or generating a CSF report for each CSI-RS of the plurality of CSI-RS.

11. The method of claim 1, further comprising:

transmitting, to the base station, an indication to update the SRS switching capability report.

12. The method of claim 1, wherein receiving the RPMI includes:

receiving the RPMI in a downlink control information (DCI) message, wherein the RPMI is mapped to a receive combination matrix in a mapping table, the mapping table mapping different RPMI values to different receive combination matrices.

13. A method of wireless communication performed by a base station, the method comprising:

receiving, from a user equipment (UE), a sounding reference signal (SRS) switching capability report indicating a first number of receive antenna ports configured for the UE to receive downlink data transmission;

receiving, from the UE, one or more SRS transmitted over the first number of receive antenna ports, wherein the one or more SRS is received over one or more SRS resources, each SRS resource of the one or more SRS resources including one or more symbols;

transmitting, to the UE, an indication of a second number of receive antenna ports for the UE to receive the downlink data transmission;

transmitting, to the UE, the downlink data transmission from the base station to be received over the second number of receive antenna ports by the UE; and transmitting, to the UE, a receive precoding matric indicator (RPMI) indicating a receive combination matrix to be used by the UE for receiving the downlink data transmission over the second number of receive antenna ports of the UE.

14. The method of claim 13, further comprising:

performing channel estimation based on the one or more SRS transmitted over the first number of receive antenna ports from the UE; and selecting the second number of receive antenna ports for the UE to receive the downlink data transmission based on the channel estimation for the first number of receive antenna ports.

15. The method of claim 14, wherein transmitting the indication of the second number of receive antenna ports includes transmitting a medium access control (MAC)-control element (CE).

16. The method of claim 15, wherein the MAC-CE includes one or more of:

one or more SRS identifications (IDs), each SRS ID of the SRS IDS associated with a respective SRS corresponding to a receive antenna port combination of the UE, wherein the second number of receive antenna ports includes the corresponding receive antenna port combination; and one or more SRS indices, each SRS index of the SRS index associated with a respective SRS transmitted in a transmission order corresponding to the each SRS index, wherein the second number of receive antenna ports includes a receive antenna port combination over which the respective SRS is transmitted to the base station.

17. The method of claim 15, wherein the MAC-CE includes one or more mapping tables mapping at least one value of a field in a downlink control information (DCI) message to a receive antenna port combination, and further comprising:

transmitting the DCI message to the UE including a value for the field in the DCI message, wherein the second number of receive antenna ports includes the receive antenna port combination to which the value for the field in the DCI message is mapped by the one or more mapping tables.

18. The method of claim 13, wherein transmitting the indication of the second number of receive antenna ports includes transmitting a downlink control information (DCI) message.

19. The method of claim 18, wherein the DCI message is transmitted together with one or more of:

a triggering of a channel state information (CSI)-reference signal (RS); or a scheduling of the downlink data transmission.

20. The method of claim 13, wherein transmitting the indication of the second number of receive antenna ports includes:

transmitting a plurality of channel state information (CSI)-reference signals (RS);

receiving channel state feedback (CSF) for the plurality of CSI-RS from the UE; and selecting a precoder from the different precoders used to precode each CSI-RS of the plurality of CSI-RS based on the received CSF.

21. The method of claim 20, wherein transmitting the indication of the second number of receive antenna ports further includes transmitting, to the UE, a CSI-RS precoded with the selected precoder corresponding to a receive antenna port combination including the second number of receive antenna ports.

22. The method of claim 20, wherein each CSI-RS of the plurality of CSI-RS precoded with a different precoder, and wherein each of the different precoder corresponding to a different receive antenna port combination of the UE.

23. The method of claim 20, wherein receiving the CSF for the plurality of CSI-RS from the UE includes one of:

receiving a single CSF report for the plurality of CSI-RS, wherein the single CSF report includes a reported rank indicator and a reported CSI-RS resource indicator (CRI); and receiving a CSF report for each CSI-RS of the plurality of CSI-RS.

24. The method of claim 13, further comprising:

receiving, from the UE, an indication to update the SRS switching capability; and updating the SRS switching capability of the UE, wherein updating the SRS switching capability of the UE includes updating the second number of receive antenna ports for the UE to receive the downlink data transmission.

25. The method of claim 14, wherein transmitting the RPMI includes:

transmitting the RPMI in a downlink control information (DCI) message, wherein the RPMI is mapped to a receive combination matrix in a mapping table, the mapping table mapping different RPMI values to different receive combination matrices.

26. A user equipment (UE) comprising:

a memory storing processor-readable code; and at least one processor coupled to the memory, the at least one processor configured to execute the processor-readable code to cause the at least one processor to perform operations including:

transmitting, to a base station, a sounding reference signal (SRS) switching capability report indicating a first number of receive antenna ports configured for the UE to receive downlink data transmission;

transmitting, to the base station, one or more SRS over the first number of receive antenna ports, wherein the one or more SRS is transmitted using one or more SRS resources, each SRS resource of the one or more SRS resources including one or more symbols;

receiving, from the base station, an indication of a second number of receive antenna ports for receiving the downlink data transmission from the base station;

receiving, from the base station, the downlink data transmission from the base station over the second number of receive antenna ports; and receiving, from the base station, a receive precoding matric indicator (RPMI) indicating a receive combination matrix to be used for receiving the downlink data transmission from the base station over the second number of receive antenna ports.

27. A base station comprising:

a memory storing processor-readable code; and at least one processor coupled to the memory, the at least one processor configured to execute the processor-readable code to cause the at least one processor to perform operations including:

receiving, from a user equipment (UE), a sounding reference signal (SRS) switching capability report indicating a first number of receive antenna ports configured for the UE to receive downlink data transmission;

receiving, from the UE, one or more SRS transmitted over the first number of receive antenna ports, wherein the one or more SRS is received over one or more SRS resources, each SRS resource of the one or more SRS resources including one or more symbols;

transmitting, to the UE, an indication of a second number of receive antenna ports for the UE to receive the downlink data transmission;

transmitting, to the UE, the downlink data transmission from the base station to be received over the second number of receive antenna ports by the UE; and transmitting, to the UE, a receive precoding matric indicator (RPMI) indicating a receive combination matrix to be used by the UE for receiving the downlink data transmission over the second number of receive antenna ports of the UE.

* * * * *